United States Patent [19]
Farrell

[11] 3,940,223
[45] Feb. 24, 1976

[54] INJECTION OF PLASTIC IN MOLDING MACHINE

[75] Inventor: John J. Farrell, Green Brook, N.J.

[73] Assignee: Farrell Patent Company, Greenbrook, N.J.

[22] Filed: Dec. 21, 1973

[21] Appl. No.: 427,333

[52] U.S. Cl. ............... 425/244; 425/245; 425/247
[51] Int. Cl.² .................... B29F 1/02; B29F 1/06
[58] Field of Search ........ 425/156, 159, 242 B, 244, 425/130, 245, 247, 166; 222/135, 138, 145, 271, 275, 278

[56] References Cited
UNITED STATES PATENTS

| | | | |
|---|---|---|---|
| 3,158,901 | 12/1964 | Westover | 425/379 |
| 3,281,899 | 11/1966 | Dacco | 425/130 X |
| 3,674,401 | 7/1972 | Annis et al. | 425/244 |
| 3,697,210 | 10/1972 | Johnson | 425/242 B X |
| 3,709,644 | 1/1973 | Farrell | 425/167 X |
| 3,733,156 | 5/1973 | Garner | 425/130 |
| 3,819,313 | 6/1974 | Josephsen et al. | 425/244 |
| 3,888,612 | 6/1975 | Schrewe et al. | 425/130 |
| 3,891,372 | 6/1975 | Takiura | 425/244 |

FOREIGN PATENTS OR APPLICATIONS

| | | | |
|---|---|---|---|
| 2,061,267 | 12/1970 | Germany | 425/244 |

Primary Examiner—Francis S. Husar
Assistant Examiner—Carl Rowold
Attorney, Agent, or Firm—Marvin Feldman

[57] ABSTRACT

This invention reduces the time that a core rod must remain at an injection station of a plastic blow molding machine. The injection operation is usually performed by a plasticizer, and while the injection operation itself requires very little time, the plasticizer performs other roles that must be complete before the next injection. This invention uses two plasticizers alternately so that one can inject while the other recovers for its next injection operation. A plastic pump is used to relieve the plasticizers of some of the operations that they previously performed.

8 Claims, 2 Drawing Figures

INJECTION OF PLASTIC IN MOLDING MACHINE

BACKGROUND AND SUMMARY OF THE INVENTION

In conventional plastic blow molding machines, the molten plastic is injected into the cavity of an injection mold to apply a parison to a core rod in the cavity. The plasticizer injects the plastic at high pressure and then maintains a reduced pressure which supplies plastic to the mold to compensate for such shrinkage as occurs from the initial cooling of the plastic in the mold cavity.

The plasticizer then draws back plastic to disconnect the runners from the parison and following this operation, the plasticizer screw works its way back in the screw barrel to accumulate a charge of plastic for the next injection operation.

In some apparatus, new core rods can be brought to the injection mold more rapidly than the plasticizer can go through its cycle; and this means that the operation of the plasticizer delays the injection operation and thus limits what could otherwise be higher production of the molding machine.

This invention utilizes two plasticizers which are used alternately. They are operated so that one of the plasticizers can prepare itself for the next injection operation while the other plasticizer is injecting molten material into the injection mold cavity. In order to make this alternate operation practical, this invention utilizes a plastic pump to perform some of the operations of each plasticizer so that after an injection of plastic into the injection mold cavity, the plasticizer which performs the injection can start recovering for the next injection.

As soon as either plasticizer has injected plastic into the injection mold cavity, valve means shut off that plasticizer from communication with the injection mold. The plastic pump maintains a pressure on the plastic to compensate for such shrinkage as occurs immediately after injection; and the plastic pump also draws back the plastic to disconnect the plastic in the runners from the parison in the cavity, both of these functions being ordinarily performed by the plasticizer. Thus the plastic pump permits the plasticizer to start its recovery operation immediately following its injection of plastic into the injection mold.

The second plasticizer stands ready to inject plastic into the injection mold as soon as the next core rod or core rods are in position and the mold has closed. The plastic from the second plasticizer is injected into the mold and the second plasticizer is immediately shut off by a valve from communication with the mold so that the plastic pump can again take over and perform the operations of compensating for shrinkage and drawing back plastic from the mold runners.

The same plastic pump can perform the shrinkage compensation and drawback operation for both of the plasticizers and in the preferred construction the plastic pump always remains in communication with the mold runners of the injection molds so that the only valving necessary is that required for putting the plasticizers alternately in communication with the injection mold followed by immediate cutoff from communication with the injection mold.

A plastic pump used as a time saver in connection with a single plasticizer is disclosed in U.S. Pat. No. 3,709,644, issued Jan. 9, 1973.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
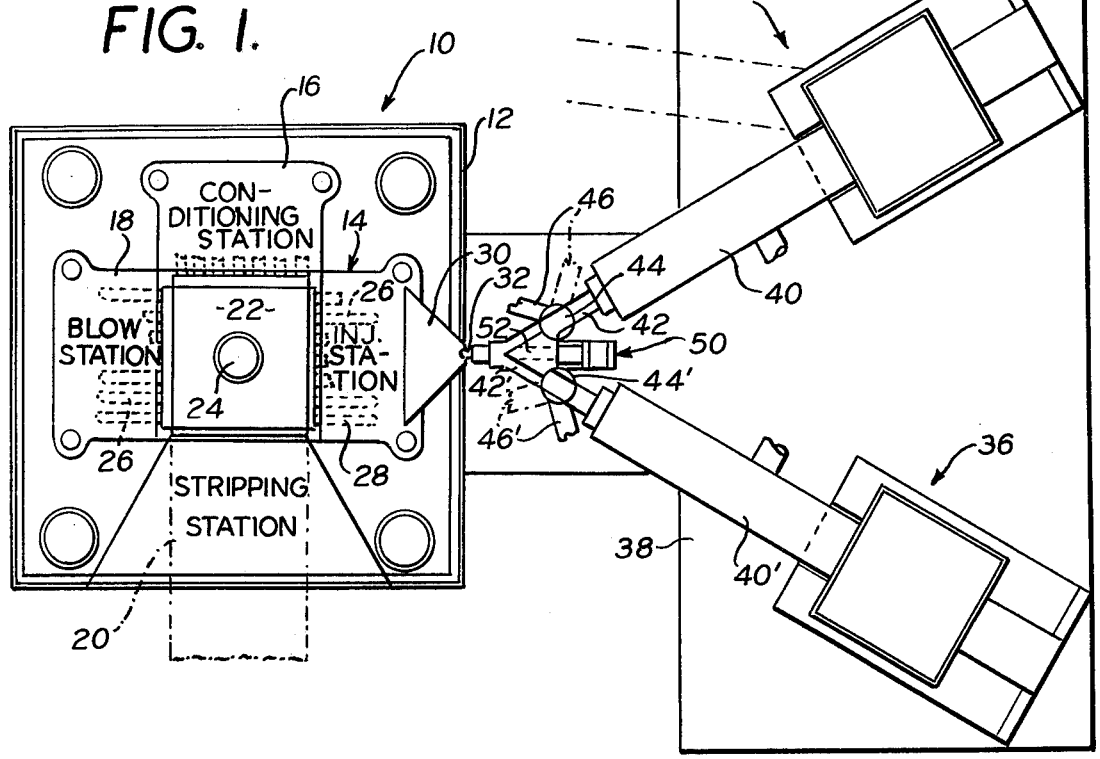
FIG. 1 is a diagrammatic top plan view of a blow molding machine equipped with two plasticizers and a plastic pump in accordance with this invention.

FIG. 1 shows a four-position blow molding machine 10 which has a frame 12 supporting an injection station 14, a parison conditioning station 16, a blowing station 18 and a stripper station 20. An indexing head 22 rotates about a center supporting shaft 24 and supports core rods 26 which extend from the four faces of the indexing head 22.

An injection mold 28 at the injection station 14 has a manifold 30 for supplying molten plastic to the cavities of the injection mold 28. At the center of the manifold 30 there is a recess for receiving an injection nozzle 32 which is supplied with plastic material from two separate plasticizers 34 and 36. These two plasticizers are mounted on a frame 38 which is movable toward and from the manifold 20 to bring the nozzle 32 into engagement with the socket of the manifold through which plastic is injected into the manifold 30 of the injection mold 28.

The plasticizer 34 has a barrel 40 which discharges plastic material into a passage 42, and there is a shutoff valve 44 by which the passage 40 can be closed for purposes which will be explained in connection with FIG. 2.

The passage 42 leads to the nozzle 32. The valve 44 is operated by a handle 46 which is shown in solid lines in the position which puts the valve 44 in open position. The dotted line position of the handle 46 puts the valve 44 in closed position.

The plasticizer 36 is similarly connected with the nozzle 32 and parts corresponding to those of the plasticizer 34 are indicated by the same reference characters for the plasticizer 36 but with a prime appended.

A time saver or plastic pump 50 is located between the passages 42 and 42' and has a passage 52 communicating with the nozzle 32.

In the operation of the apparatus shown in FIG. 1, one or the other of the plasticizers 34 or 36 discharges a supply of molten plastic material into the manifold 30 to fill the cavities of the injection mold 28 and thereby coat each of the core rods, in the different mold cavities, with a parison. When the injection mold 28 opens, the shaft 24 lifts the indexing head 22, and the core rods 26 which the indexing head carries, high enough to clear the fixed lower section of the mold 28; and the indexing head turns 90° to carry the core rods 26 and their parisons to a conditioning station 16. Other core rods which were at the stripping station 20 move into position at the injection station and are lowered into position as the support 24 lowers the indexing head.

The injection mold 28 again closes and a supply of molten plastic material is supplied to the injection mold cavities from the other plasticizer 36. The function of the plastic pump 50 will be described in connection with FIG. 2.

After the parisons have been applied to the new group of core rods 26, the injection mold 28 again opens, the indexing head rises, and the core rods advanced one station as the indexing head rotates through another angle of 90°. This carries the indexing heads at the conditioning station 16 to the blow mold at the blow station 18 and carries the new group of core rods from the injection station 14 to the conditioning station 16.

This type of plastic blow molding machine is well known and no additional illustration or description of it is necessary for a complete understanding of this invention. The novelty of the present invention is in the apparatus for supplying the molten plastic material to the injection mold 28 in combination with a blow molding machine of the type shown in FIG. 1.

Figure 2:
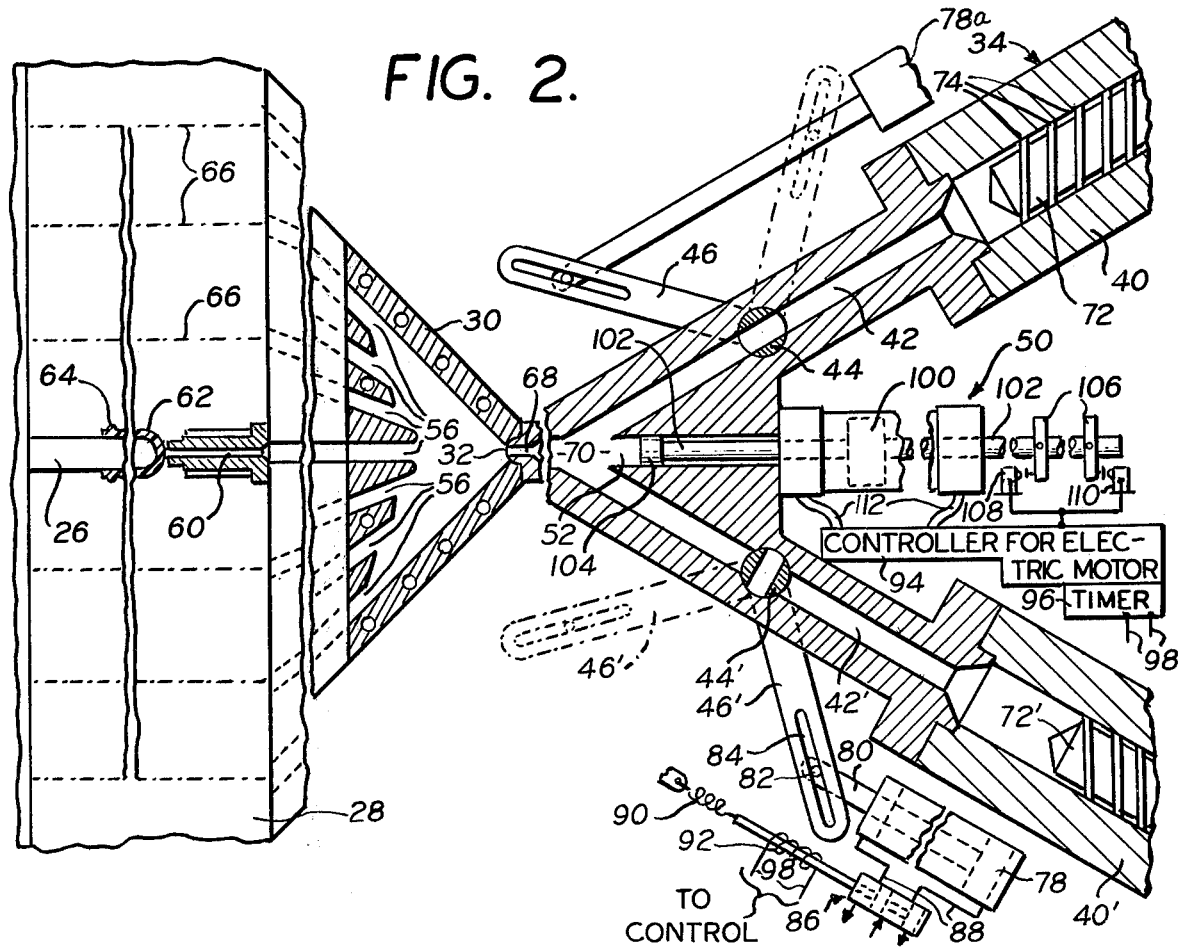
FIG. 2 is a fragmentary view, mostly in section, showing the injection mold, plasticizers and plastic pump of FIG. 1 on a larger scale.

FIG. 2 shows the manifold 90 with runners 56 leading to seven different cavities of the mold 28. The center runner 56 of the manifold 30 is shown communicating with a runner 60 of the injection mold 28, and this runner 60 leads into a cavity 62 into which a core rod 26 extends. The cavity 62 is shown filled with plastic material 64 which comprises the parison that is coated over the portion of the core rod 26 which projects into the cavity 62. In FIG. 2 the cavity 62 is shown very much shortened by the fact that much of the mold 28 is broken away in order to increase the scale of the drawing.

Only one cavity 62 is shown, but it will be understood that all of the runners 56 of the manifold 30 communicate with other runners and mold cavities similar to the runner 60 and mold cavity 62 but which are merely indicated in FIG. 2 by the broken lines 66 which are the center lines of such injection mold cavities and mold runners.

FIG. 2 shows the nozzle 32 located in the socket 68 of the manifold 20 and held in the socket with sufficient force to resist the pressure of the material discharged from a passage junction 70 where the passages 42, 42' and 52 come together.

FIG. 2 shows the interior of the barrel 40 of the plasticizer 34. A plasticizer screw 72, located in the barrel 40, has helical screw threads 74 which advance the plastic material in the barrel 40 as the screw 72 rotates.

The screw 72 accumulates plastic material in the inside of the barrel 40 ahead of the screw and the screw forces itself back, toward the right in FIG. 2, as more plastic material is accumulated beyond the forward end of the screw.

When enough material has been accumulated ahead of the screw 72, the rotation of the screw stops; and when this material is to be fed forward through the passage 42 and into the injection mold, the screw 72 is pushed forward like a piston to force the material from the interior of the barrel 40 without any rotation of the screw. It will be understood that in the operation of the plasticizer 34 the passage 42 and the manifold 30 will already contain plastic material from previous cycles of the machine so that the piston stroke of the screw 72 need displace only as much plastic as is necessary to fill all of the cavities of the injection mold; that is, to replace the plastic material that was carried away on the core rods at the previous injection operation.

This operation of the plasticizer 34 is conventional and the apparatus for rotating the screw 72 for one operation and advancing it as a piston without rotation for another operation are well understood in the art and no description of this apparatus is necessary for a complete understanding of the present invention.

The plasticizer 36 operates in the same way as the plasticizer 34 but these plasticizers alternate in supplying plastic material to the manifold in the injection mold. In FIG. 2 the screw 72 of the plasticizer 34 may be considered as advancing as a piston since the valve 44 is open for communication with the manifold 30 and plastic forced through the passage 42 by the screw 72 is advanced through the manifold 30, manifold runners 56 and mold runners 60 into the injection cavities 62 of the mold 28. The plasticizer 36 may be considered as accumulating material for the next charge since its valve 42' is closed and material advanced beyond the end of the screw 72', as this screw rotates, is accumulated ahead of the screw while the screw 72 moves back away from the passage 42'.

Operating mechanism for the handle 46' is shown as a cylinder-and-piston motor 78 having a piston rod 80 with a pin 82 that extends through a slot 84 in the handle 46'. Reciprocating movement of the motor 78 causes the handle 46' to move through an angle of approximately 90° from the full line position shown to the dotted line position and this turns the valve 42' from closed position to open position. It will be understood that this operating mechanism is merely diagrammatic and simplified for clearer illustration. It represents an actuator for opening and closing the valve 42'.

Apparatus for supplying working fluid to the motor 78 includes a slide valve 86 with piping 88 leading to opposite ends of the cylinder of the motor 78. This slide valve 86 has a center supply line for working fluid and two exhaust lines indicated by the arrows under the slide valve 86. The slide valve is moved toward the left by a spring 90 whenever a solenoid 92 is deenergized. Energizing of the solenoid 92 moves the slide valve 86 into the position indicated by dotted lines in FIG. 2 and this supplies working fluid to the right hand end of the motor 78 to move the piston rod 80 toward the left so that the valve 42 is moved from closed to open position.

Power leads of the solenoid 92 lead to a controller 94 including a timer 96 with power lines 98 leading to the solenoid 92.

The plastic pump 50 includes a cylinder-and-piston motor having a piston 100 secured to a piston rod 102 which extends into the passage 52 and which carries a small working piston 104 at the crank end of the piston rod 102.

Adjustable collars 106 on a part of the piston rod 102 beyond the head end of the motor 50 operate limit switches 108 and 110 for stopping the movement of the piston rod 102 and the piston 104 at the desired limits of its stroke.

Working fluid for the motor of the pump 50 is supplied through tubing 112 leading from the controller 94 to the opposite ends of the cylinder on opposite sides of the piston 100. The limit switches 108 and 110 operate the controller to shut off the supply of working fluid to the motor. It will be understood that the controller 94 is tied in with the controls for the plasticizers 34 and 36.

The working piston 104 is actually the portion of the plastic pump 50 that contacts with the molten plastic. As soon as the plasticizer 34 has completed a stroke injecting plastic material into the manifold 30 and the cavities of the injection mold 28, the control mechanism operates a motor 78a which is identical with the motor 78 already described; and this operation pulls the handle 46 from the full line position to the dotted line and thereby closes the valve 44. The controller 94 then supplies working fluid to move the piston 100 toward the left in FIG. 2. This pressure on the piston 100 applies pressure to the plastic material in the manifolds 30 and mold 28 so as to move additional material into the manifold and injection mold as necessary to compensate for shrinkage of the plastic during the initial cooling which follows an injection step.

The controller then reverses the flow of working fluid to the piston 100 and urges the piston 100 to move toward the right so that the working piston 104 draws back molten plastic material from the runners in the manifold 30 and the injection mold 28. During this time both of the valves 44 and 44' are closed, and the plasticizer 34 which made the last injection into the manifold 30 and mold 28 can be recovering for the next injection it will make, since the plastic pump 50 has relieved the plasticizer 34 from the usual plasticizer function of compensating for shrinkage and drawing back the plastic in the mold runners.

As the injection mold 28 closes for the next group of core rods, the motor 78 is actuated by the timer 98 to open the valve 44' so that the plasticizer 36 can inject a new charge of plastic material into the manifold 30 and injection mold 28.

As soon as the plasticizer 36 has completed its injection of the necessary amount of plastic to fill the injection mold cavities, the motor 78 closes the valve 44' and the plastic pump 50 again operates to compensate for shrinkage and to draw back plastic from the mold runners as already described in connection with the operation of the plasticizer 34.

The operation of the valve 44 is under the control of the controller 94 in the same way as the valve 44' and as already described in connection with the valve 44'. It will be apparent from the foregoing description that the plastic pump 50 can operate to relieve both of the plasticizers 34 and 36 from the usual plasticizer operations of compensation for shrinkage and drawback of runners; and this combined with the fact that each plasticizer need operate only every other cycle greatly shortens the injection period of the molding machine.

The preferred embodiment of the invention has been illustrated and described, but changes and modifications can be made and some features can be used in different combinations without departing from the invention as defined in the claims.

What is claimed is:

1. Injection molding apparatus including an injection mold that opens for transfer of the injected material from the mold and that closes for the start of a subsequent injection cycle, a first and a second plasticizer, each of which fully charges the mold with the same kind of hot plastic material as the other plasticizer for alternate injection cycles, passages through which both plasticizers communicate with the mold, valve means for selectively shutting off the communication of each of the plasticizers from the mold for each alternate cycle, and control means connected to the valve means to shut off communication of the first plasticizer from the mold at the end of an injection operation of the first plasticizer and before the fully charged mold opens, the control means including means for operating the valve means to put the second plasticizer in communication with the mold following the next closing of the mold and while the first plasticizer is recovering for its next injection operation, characterized by the passages from the two plasticizers including a nozzle that connects with the mold at the entrance of a runner passage of the mold, said passages including a passage through the nozzle and branch passages from said nozzle passage to each of the plasticizers, the valve means being in said branch passages, means to draw back plastic material from the runner at the conclusion of each injection operation communicating with said nozzle and being located at the branch passages end of said nozzle.

2. The injection molding apparatus described in claim 1 said means to draw back plastic material comprising pump means and a passage through which the pump means communicates with the mold at a location on the mold side of the valve means.

3. The injection molding apparatus described in claim 2 characterized by the pump means communicating with the mold downstream of the valve means and being operable independently of the shutting off of the communication of either plasticizer with the mold whereby said pump means can draw back from the mold material injected by either of the plasticizers.

4. Injection molding apparatus including an injection mold that opens for transfer of the injected material from the mold and that closes for the start of a subsequent injection cycle, a first and a second plasticizer, each of which fully charges the mold, with the same kind of hot plastic material as the other plasticizer, passages through which both plasticizers communicate with the mold, valve means for selectively shutting off the communication of each of the plasticizers from the mold, and control means connected to the valve means to shut off communication of the first plasticizer from the mold at the end of an injection operation of the first plasticizer and before the fully charged mold opens, the control means including apparatus that operates the valve means to put the second plasticizer in communication with the mold following the next closing of the mold and while the first plasticizer is recovering for its next injection operation, characterized by pump means that draws back plastic material from the mold at the conclusion of each injection operation, and a passage through which the pump means communicates with the mold at a location on the mold side of the valve means, characterized by the pump means communicating with the mold downstream of the valve means and being operable independently of the shutting off of the communication of either plasticizer with the mold whereby said pump means can draw back from the mold material injected by either of the plasticizers, further characterized by the valve means including two separate valves, a different one of which shuts off communication between each of the plasticizers and the mold, the pump means communicating with the mold side of each of the valves.

5. The injection molding apparatus described in claim 2 characterized by controls that actuate the pump means in timed relation with the valves that shut off communication of the plasticizers with the mold.

6. The injection molding apparatus described in claim 1 characterized by the injection mold including a plurality of cavities for receiving a number of separate core rods, a manifold in the injection mold with runners extending to the individual cavities, and a single entrance passage to the manifold for receiving molten material from a nozzle that communicates with both of the plasticizers.

7. The injection molding apparatus described in claim 6 characterized by pump means communicating with the manifold for sucking back material to sever the runner plastic from the parisons in the respective cavities.

8. Injection molding apparatus including an injection mold that opens for transfer of the injected material from the mold and that closes for the start of a subsequent injection cycle, a first and a second plasticizer, each of which fully charges the mold, with the same kind of hot plastic material as the other plasticizer, passages through which both plasticizers communicate with the mold, valve means for selectively shutting off the communication of each of the plasticizers from the mold, and control means connected to the valve means to shut off communication of the first plasticizer from the mold at the end of an injection operation of the first plasticizer and before the fully charged mold opens, the control means including apparatus that operates the valve means to put the second plasticizer in communication with the mold following the next closing of the mold and while the first plasticizer is recovering for its next injection operation, characterized by the passages from the two plasticizers including a nozzle that connects with the mold at the entrance of a runner passage of the mold, said passages including a single passage through the nozzle and branch passages from said single passage to each of the plasticizers, the valve means being in said branch passages, further characterized by pump means connected directly with the single passage for compensating shrinkage of the material in the mold.

* * * * *